United States Patent
Hokari et al.

(10) Patent No.: US 6,507,580 B1
(45) Date of Patent: Jan. 14, 2003

(54) METHOD OF CONTROLLING A CALLING IN DISTRIBUTED NODE EXCHANGE NETWORK, DISTRIBUTED NODE EXCHANGE AND DISTRIBUTED NODE EXCHANGE NETWORK

(75) Inventors: Makoto Hokari, Tokyo (JP); Isao Oishi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/013,037

(22) Filed: Jan. 26, 1998

(30) Foreign Application Priority Data

Jan. 24, 1997 (JP) .............................. 9-011263

(51) Int. Cl.[7] .................................................. H04J 15/00
(52) U.S. Cl. ...................... 370/360; 370/285; 370/284; 370/395.2; 370/401; 370/465
(58) Field of Search ................................. 370/230, 236, 370/285, 360, 384, 395, 396, 400, 401, 402, 450, 465, 468, 474, 395.2, 395.32; 379/219, 220, 234, 220.01

(56) References Cited

U.S. PATENT DOCUMENTS

| | | | | |
|---|---|---|---|---|
| 5,341,374 A | * | 8/1994 | Lewen et al. | 370/450 |
| 5,802,054 A | * | 9/1998 | Bellenger | 370/401 |
| 6,212,562 B1 | * | 4/2001 | Huang | 370/468 |
| 6,243,382 B1 | * | 6/2001 | O'Neill et al. | 370/474 |

FOREIGN PATENT DOCUMENTS

| | | | | |
|---|---|---|---|---|
| JP | 61-267859 | 11/1986 | ........... | G06F/15/16 |
| JP | 62501949 | 7/1987 | ........... | H04Q/11/04 |
| JP | 62230251 | 10/1987 | ........... | H04M/7/06 |
| JP | 63-211997 | 9/1988 | ........... | H04Q/5/00 |
| JP | 2206996 | 8/1990 | ........... | H04Q/3/545 |
| JP | 3210893 | 9/1991 | ........... | H04Q/3/58 |
| JP | 3-235560 | 10/1991 | ........... | H04M/3/00 |
| JP | 4-27244 | 1/1992 | ........... | H04L/12/48 |
| JP | 4199959 | 7/1992 | ........... | H04M/3/50 |
| JP | 4-217149 | 8/1992 | ........... | H04M/3/00 |
| JP | 4296146 | 10/1992 | ........... | H04M/3/00 |
| JP | 5-168055 | 7/1993 | ........... | H04Q/3/545 |
| JP | 6224999 | 8/1994 | ........... | H04M/3/00 |
| JP | 6-245243 | 9/1994 | ........... | H04Q/3/58 |
| JP | 7-143226 | 6/1995 | ........... | H04M/3/00 |
| JP | 7203501 | 8/1995 | ........... | H04Q/3/58 |
| JP | 7-212479 | 8/1995 | ........... | H04M/3/42 |
| JP | 7-264268 | 10/1995 | ........... | H04M/3/00 |
| JP | 7-298320 | 11/1995 | ........... | H04Q/3/545 |
| JP | 8331243 | 12/1996 | ........... | H04M/3/00 |

* cited by examiner

*Primary Examiner*—Douglas Olms
*Assistant Examiner*—Shick Hom
(74) *Attorney, Agent, or Firm*—Sughrue Mion, PLLC

(57) ABSTRACT

The present invention provides a method of controlling a call between nodes in a distributed node exchange network having interconnections of plural exchanges, wherein a distributed node has a channel switch, a subscriber circuit, a trunk circuit accommodating local lines and private lines and a processor for controlling a call of the nodes. In a case of connections between the nodes, the node call control processor accommodating call extension lines and the other node call control processor accommodating receiving extension line in correspondence to the call extension lines carry out distributed processings of the call control for providing substantially the same connection services as the interconnection in the node.

8 Claims, 11 Drawing Sheets

METHOD OF CONTROLLING A CALLING IN DISTRIBUTED NODE EXCHANGE NETWORK, DISTRIBUTED NODE EXCHANGE AND DISTRIBUTED NODE EXCHANGE NETWORK

BACKGROUND OF THE INVENTION

The present invention relates to a distributed node exchange system, and more particularly to a method of controlling a calling of a distributed node exchange and a distributed node network which are capable of facilitation of processes for calling a plurality of node exchanges for improvement in services to subscribers in a network having a plurality of node exchanges.

As illustrated in FIG. 1, a private exchange comprises a channel switch TDSW, a subscriber circuit LC containing terminals such as telephones, a private circuit TRK connected to private networks 1 and a central processing unit CPU for controlling them and the like. The central processing unit CPU has a calling control section 2 for execution and control of exchange services, a PM scanning section 3 for detecting processing requests from the subscriber circuit LC and from the private circuit TRK, a PM controlling section 4 for sending instructions to the subscriber circuit LC and the private circuit TRK and also controlling them, and a SW switch control section 5 for controlling switching operations of the channel switch TDSW. The control section has interconnections 2-1, TRK call 2-2, TIRK receive 2-3, extension camp-on 24, inter-local camp-on call 2-5, and inter-local camp-on receive 2-5 and others.

This exchange is capable of offering aided services which settle such problems as a difficulty in communication from caller's terminals to receiver's terminal due to unavailability in other service of the receiver's terminal or due to the absence of receiver. Sometimes, the exchange is required to have a special service function and a high service function in response to special functions which might be required, for example, in hotels.

The above private exchange has various service functions, for example, camp-on, call-pickup, conference telephone system, private pocket bell paging and other many service functions.

The conventional exchange is realized by providing separate calling control processors for every services.

As described above, the provide exchange has the various service functions. A plurality of such provide exchanges are interconnected to each other in the form of network to establish the node exchange or the node exchange network system. In those node exchange or the node exchange network system, the exchanges are interconnected via trunk connections such as analog or digital trunks. Signal communications are made for calling control at an interface I/F of each trunk. For this reason, the available amount of the calling control signals in the interface I/F of the each trunk is limited, As a result, the services by connection between the exchanges is considerably inferior to the services by interconnection in a single private exchange. Even if the limitation of the capacity of the trunk interface I/F could be overcome and the trunk interface I/F is added in the calling control section for the calling control processing, at least two calling control processings are required to caller and receiver respectively due to the trunk interface I/F. This makes the calling control processings complicated as compared to the interconnection system.

Further, the exchanges in the network are separate exchanges. Maintenance of the separate exchanges are inconvenient.

In the above circumstances, it had been required to develop a novel method of controlling a calling in distributed node exchange network, a novel distributed node exchange and a novel distributed node exchange network free from the above problems.

SUMMARY OF THE INVENTION

Accordingly, it is an object of the present invention to provide a novel method of controlling a calling in distributed node exchange network free from the above problems.

It is a further object of the present invention to provide a novel distributed node exchange free from the above problems.

It is a still further object of the present invention to provide a novel distributed node exchange network free from the above problems.

It is yet a further object of the present invention to provide substantially the same services as when all subscribers in the network are accommodated in a single exchange by substantially the same calling control as in the case of interconnections even the trunk connection is used as the actual interface between the exchanges in a distributed node exchange system having a plurality of exchanges interconnected in network.

It is a further more object of the present invention to enable calling control processings by external interconnections to simplify the calling control processings of the exchanges without providing separate calling control processors for different functions such as trunk call and trunk receive.

It is still more object of the present invention to realize a unified management of the plural nodes in the exchange network having a plurality of nodes.

It is moreover object of the present invention to provide a novel node exchange capable of calling control function and management and use function.

The above and other objects, features and advantages of the present invention will be apparent from the following descriptions.

The present invention provides a method of controlling a call between nodes in a distributed node exchange network having interconnections of plural exchanges, wherein a distributed node has a channel switch, a subscriber circuit, a trunk circuit accommodating local lines and private lines and a processor for controlling a call of the nodes. In a case of connections between the nodes, the node call control processor accommodating call extension lines and the other node call control processor accommodating receiving extension line in correspondence to the call extension lines carry out distributed processings of the call control for providing substantially the same connection services as the interconnection in the node.

BRIEF DESCRIPTION OF THE DRAWINGS

Preferred embodiments according to the present invention will be described in detail with reference to the accompanying drawings.

DISCLOSURE OF THE INVENTION

Figure 1:
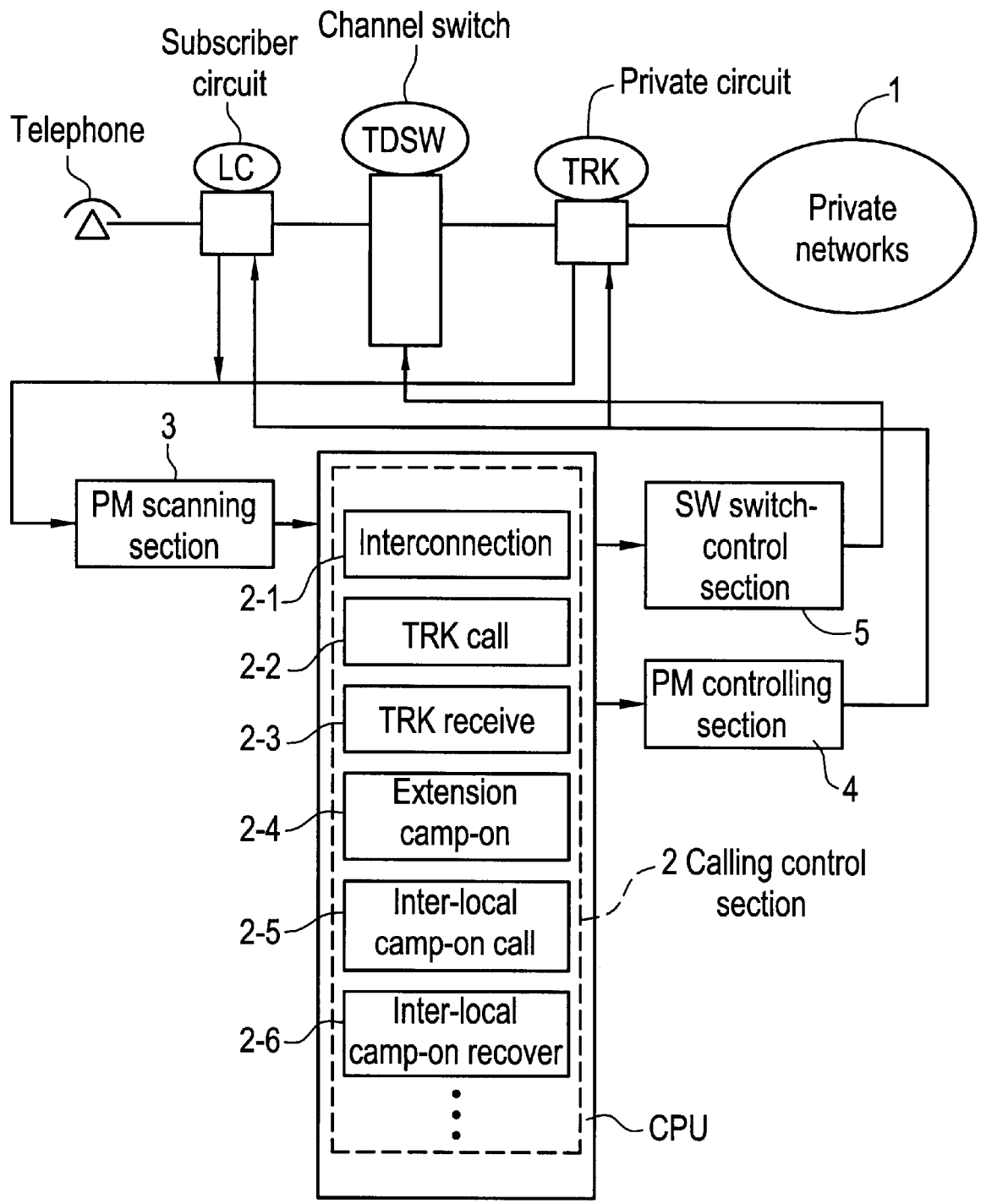
FIG. 1 is a block diagram illustrative of the conventional local exchange.

The present invention provides a method of controlling a call between nodes in a distributed node exchange network having interconnections of plural exchanges, wherein a distributed node has a channel switch, a subscriber circuit, a trunk circuit accommodating local lines and private lines and a processor for controlling a call of the nodes. In a case of connections between the nodes, the node call control processor accommodating call extension lines and the other node call control processor accommodating receiving extension line in correspondence to the call extension lines carry out distributed processings of the call control for providing substantially the same connection services as the interconnection in the node.

The call control processor has a subscriber circuit, a peripheral module (PM) canning section for detecting a processing request of a trunk circuit, a peripheral module (PM) control, section for controlling the subscriber circuit and the trunk circuit a calling control section for execution and management of exchange connection services, a switching control section for controlling a channel switch, a communication control section for communicating control signals between different calling control processors, and a converter section for relative conversion between physical positions indicating the physically accommodating positions of the trunk and subscriber circuit and logical positions independent from the physical positions so as to control the calling control section at the logical accommodation position.

There are unique node numbers in the distributed node exchange network so that the physically accommodating positions comprise the node numbers and channel switch accommodating positions at the nodes and a conversion section for inter-conversion between the logical and physical accommodation positions.

An event transfer determination circuit may be provided for determination which calling control processors of nodes in the distributed network are to deal with the processing request detected by the peripheral module (PM) scanning section. If the processing node is the other node than one determined by the event transfer determination circuit, then the processing request is transferred to the node determined by the event transfer determination circuit. The calling control section to which the request has been transferred executes the calling connection processing by sending instructions to the SW control section and the PM control section of the determined node. If the self node is to be controlled, then the PM control section controls the channel switch, the subscriber circuit and the trunk circuit. If the other node is to be controlled, then the PM control section controls via the communication control section the other channel switch, the other subscriber circuit and the other trunk circuit in the other node.

The SW control section in the calling control processor has in the inside or outside connection control sections. This connection control section is capable of controlling the channel switches of plural other nodes having trunk nodes through the communication control section.

The communication control section has a logical connection management circuit capable of transmission and receipt of control signals and maintenance signals to and from the every distributed nodes. The logical connection carries out setting and managing for every nodes. Judgements of connection and disconnection of the logical connections are made for restriction of connection to the node which should be in the disconnection state.

The exchange connection processing in the node is made only by the calling control processor of the same node. Even if this node is in the logical disconnection state from all of the other nodes in the logical connection management circuit, then the exchange connection processing in the self node is possible.

The node exchange has the channel switch, the subscriber circuit, a trunk circuit accommodating local lines and private lines and the above described calling control processor.

The distributed node exchange system comprises a node exchange wherein the calling control processors are connected by local area networks.

The channel switch comprises node exchanges interconnected to each other via digital private lines. The calling control processor is connected through the channel of the trunk connection.

There are provided a local node system comprising a plurality of node exchanges wherein the channel switch is connected by the channel switch connectors and the calling control processors are connected by the local area network, and a private network node system comprising node exchanges wherein the channel switches are interconnected by the node exchanges and the digital private lines and those calling control processors are connected to other local area network, so that the local area networks are connected by the channels connected by the digital private lines.

A data base application'server is connected to one of the local area networks.

A maintenance terminal is connected directly or via a public network to one of the local area network.

The distributed node exchange network is provided with a network management node having maintenance function for every node exchanges. This network management node is provided with the same function as the node exchange so that a specific node exchange in the distributed node network serves as the network management node.

PREFERRED EMBODIMENTS

First Embodiment

Figure 2:
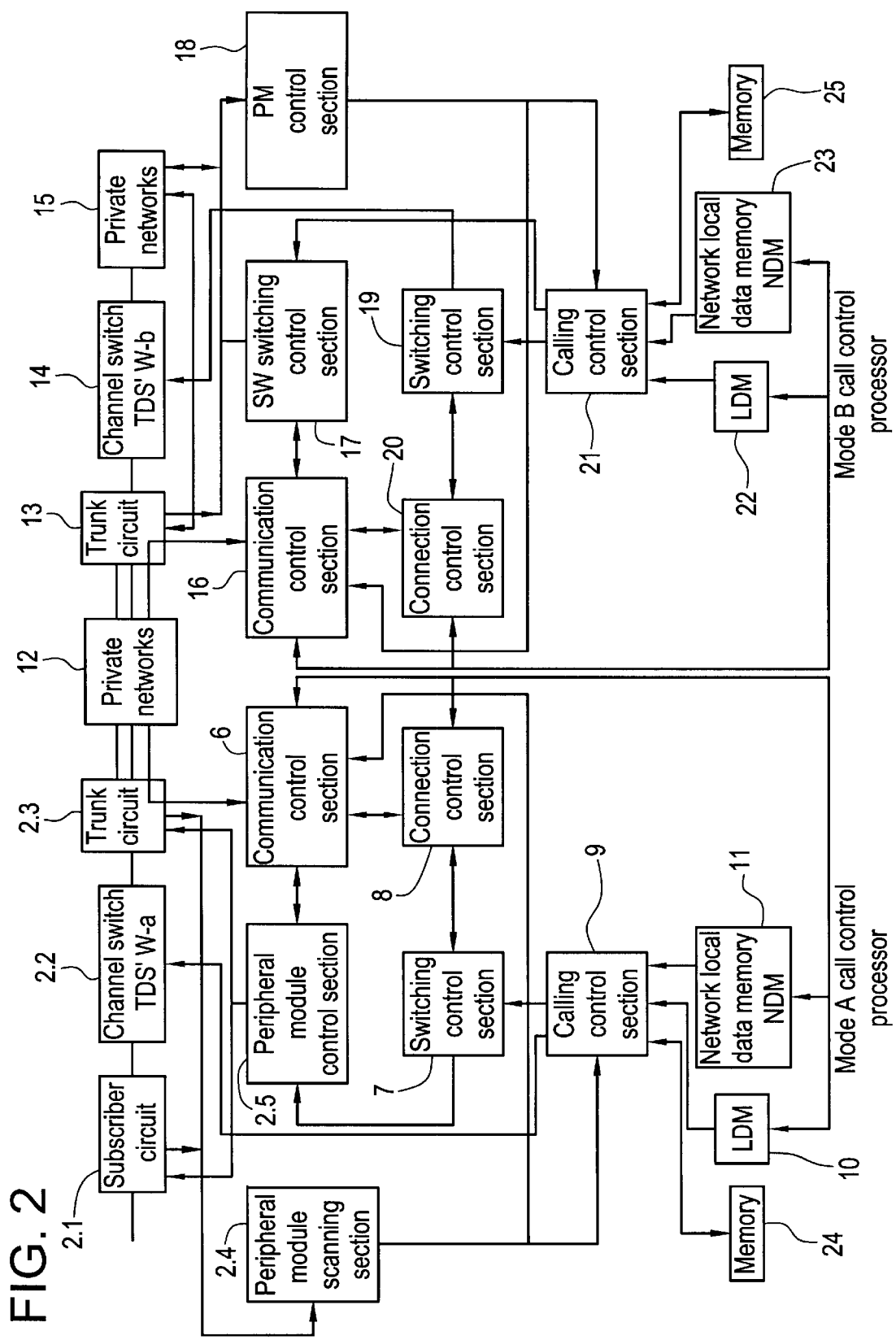
FIG. 2 is a block diagram illustrative of one embodiment in accordance with the present invention wherein an extension interconnection service function is realizable to a terminal accommodated in other node exchange.

A first embodiment according to the present invention will be described in detail with reference to FIG. 2 which is a block diagram illustrative of one embodiment in accordance with the present invention wherein an extension interconnection service function is realizable to a terminal accommodated in other node exchange.

A node "A" has a channel switch TDSW-a 2, a peripheral module scanning section 4 of a node calling processing control circuit or a call processing software for a processor CPU, a calling control section 9, a peripheral module control section 5, a switching control section 7, a connection control section 8 and a communication control section 6. A node "B" has a channel switch TDSW-b 14, a peripheral module scanning section 18 of a node calling processing control circuit or a call processing software for a processor CPU, a calling control section 21, a peripheral module control section 17, a switching control section 19, a connection control section 20 and a communication control section 16.

The necessary informations for control of the various service functions in each nodes "A" and "B" are stored in local data memory which can be referred from the calling control section. The node "A" has a local data LDM-a 10 as a specific information for each node and a network local data NDM 11 common to each node. The node "B" has a local data LDM-b 22 as a specific information for each node and a network local data NDM 23 common to each node.

Figure 3:
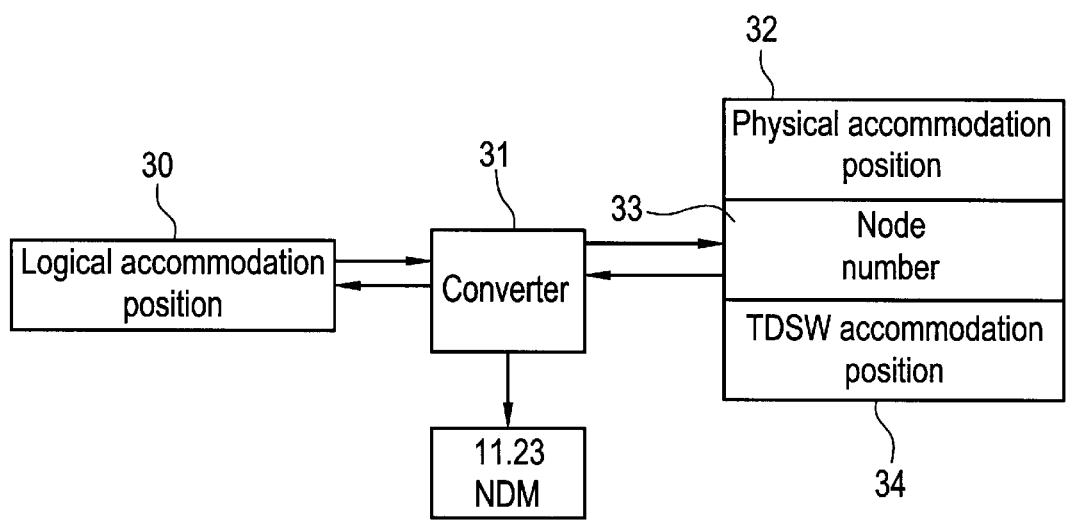
FIG. 3 is a block diagram illustrative of an accommodation position converter section in one embodiment in accordance with the present invention.

FIG. 3 is a block diagram illustrative of an accommodation position converter section in one embodiment in accordance with the present invention. Calling control resources such as a subscriber circuit accommodated in the node exchange, and a trunk circuit are allocated with a physical accommodation position and a logical accommodation position independent from the physical accommodation position. A converter 31 is realized by a control circuit or a calling software for a processor CPU. The converter 31 is to convert the logical accommodation position to the physical accommodation position and also convert the physical accommodations position to the logical accommodation position. The converter 31 is provided in each node. Informations necessary for conversion are previously set in the network local data memories NDM 11 and 23. The converter circuit is referable from the all sites or positions except for the PM scanning sections 4 and 18, the PM control sections 5 and 17, the switching control sections 7 and 19, the connection control sections 8 and 20, and the communication control sections 6 and 16. The converter may alternatively be configured so that the necessary informations for conversion between the logical and physical accommodation positions are stored in the memories 24 and 25 to convert the physical accommodation position if any of a telephone which is positioned nearest the subscriber.

Figure 4:
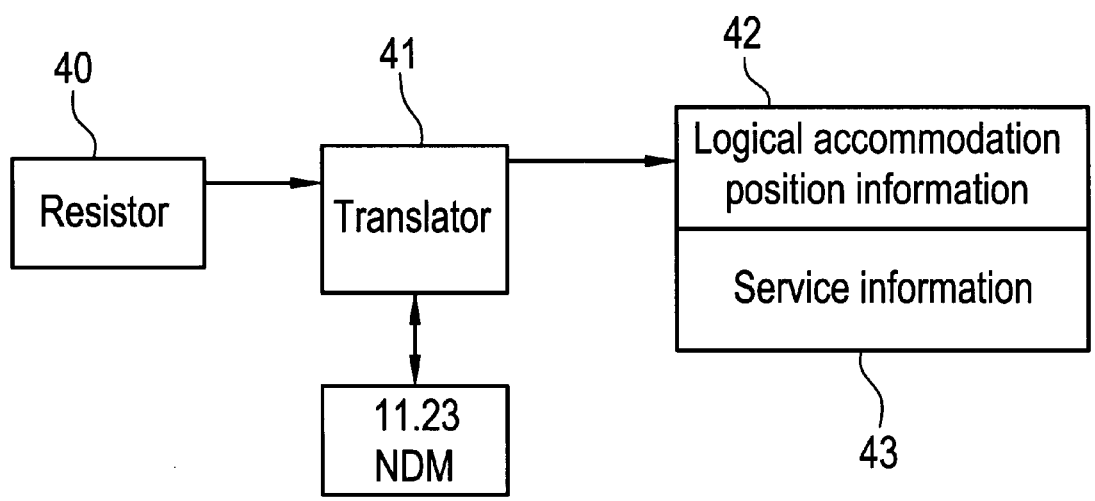
FIG. 4 is a block diagram illustrative of a translator configuration in one embodiment in accordance with the present invention.

FIG. 4 is a block diagram illustrative of a translator configuration in one embodiment in accordance with the present invention. Number having been dialed by caller is analyzed to obtain a logical accommodation position information 42 of a called subscriber stored in the network local data memories NDM 11 and 23 and also to obtain a service information 43 which is to be utilized for controlling the calling.

Subsequently, operations of the control of the exchange and service function will be described with reference to FIGS. 5 through 10. FIGS. 5 through 9 are flow charts of processings of control of the exchange and service function in the preferred embodiment in accordance with the present invention.

Figure 5:
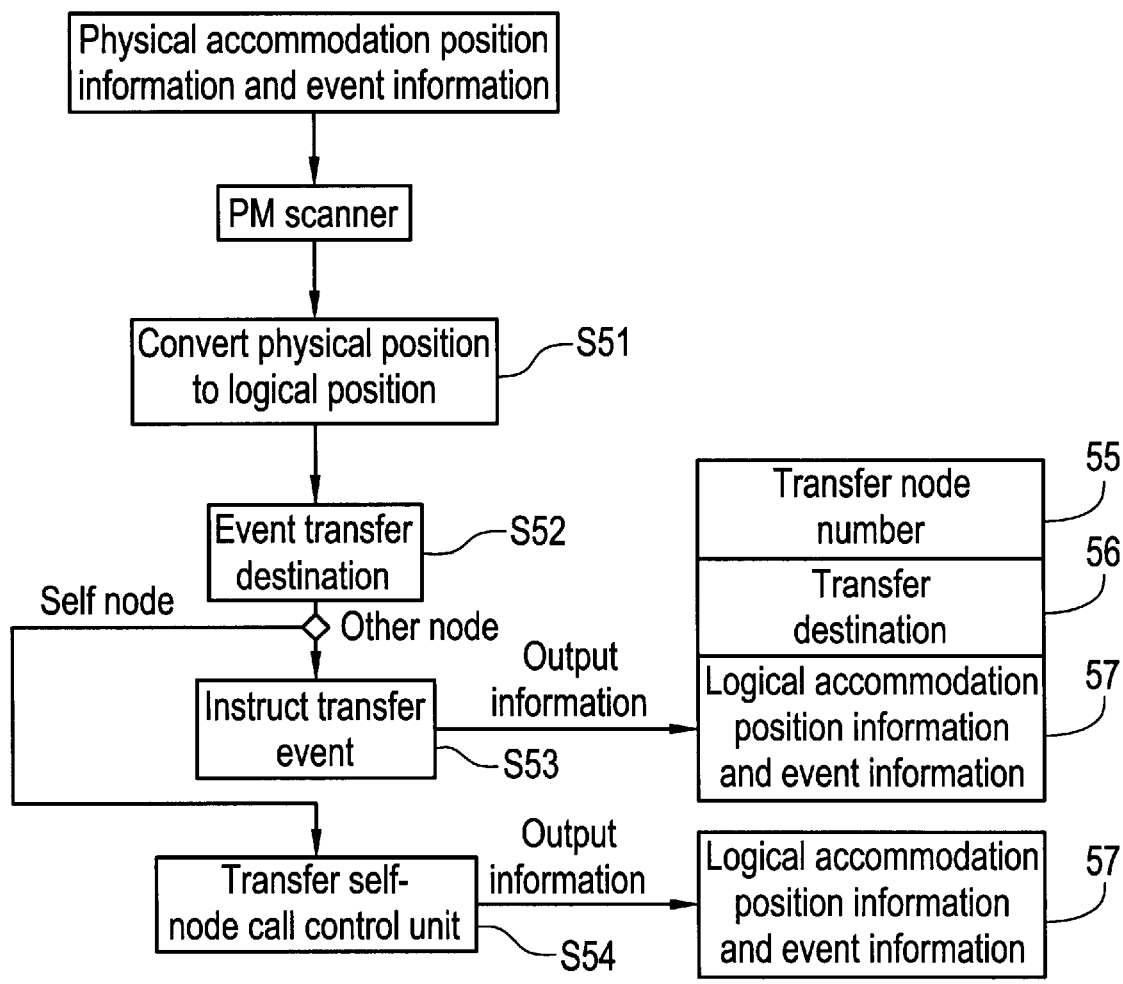
FIGS. 5 through 9 are flow charts of processings of control of the exchange and service function in the preferred embodiment in accordance with the present invention.
Figure 6:
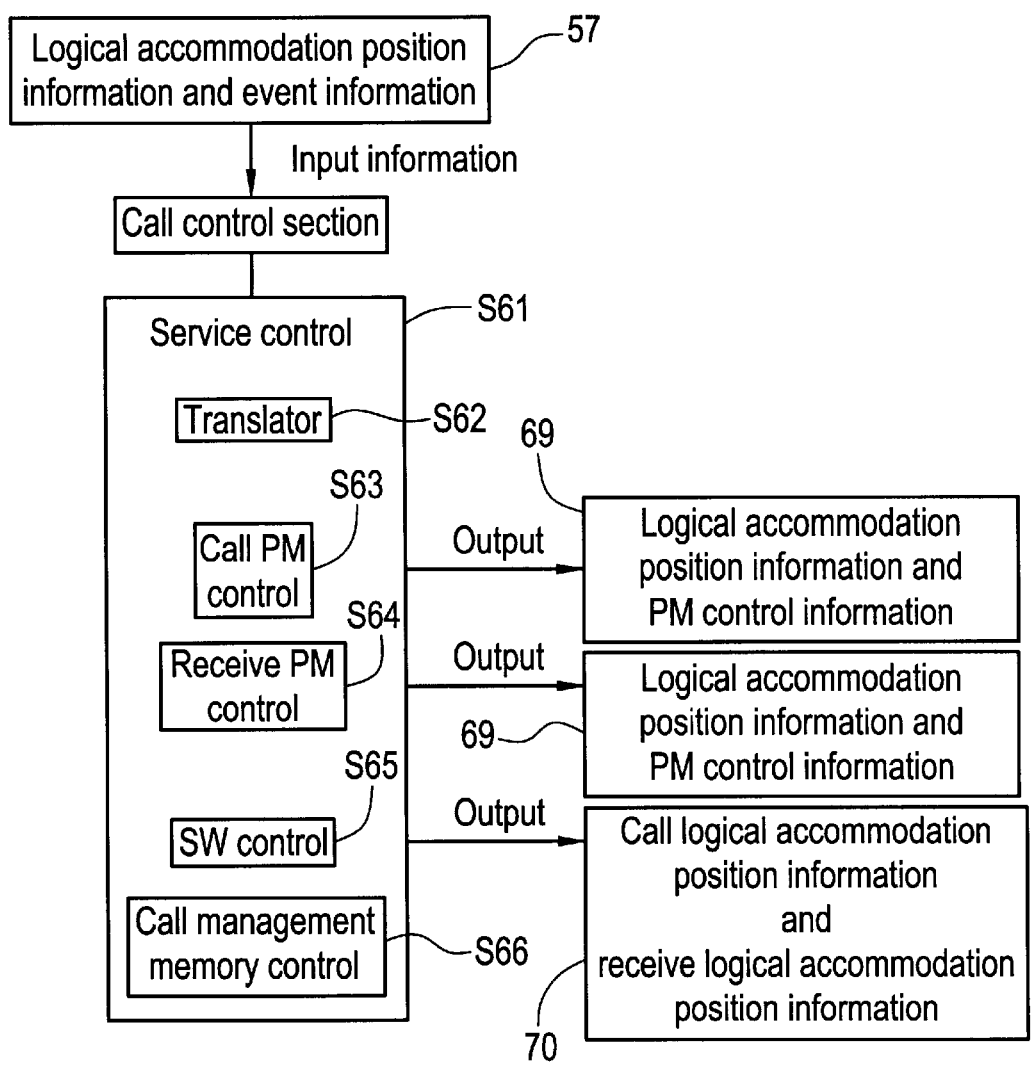
Figure 10:
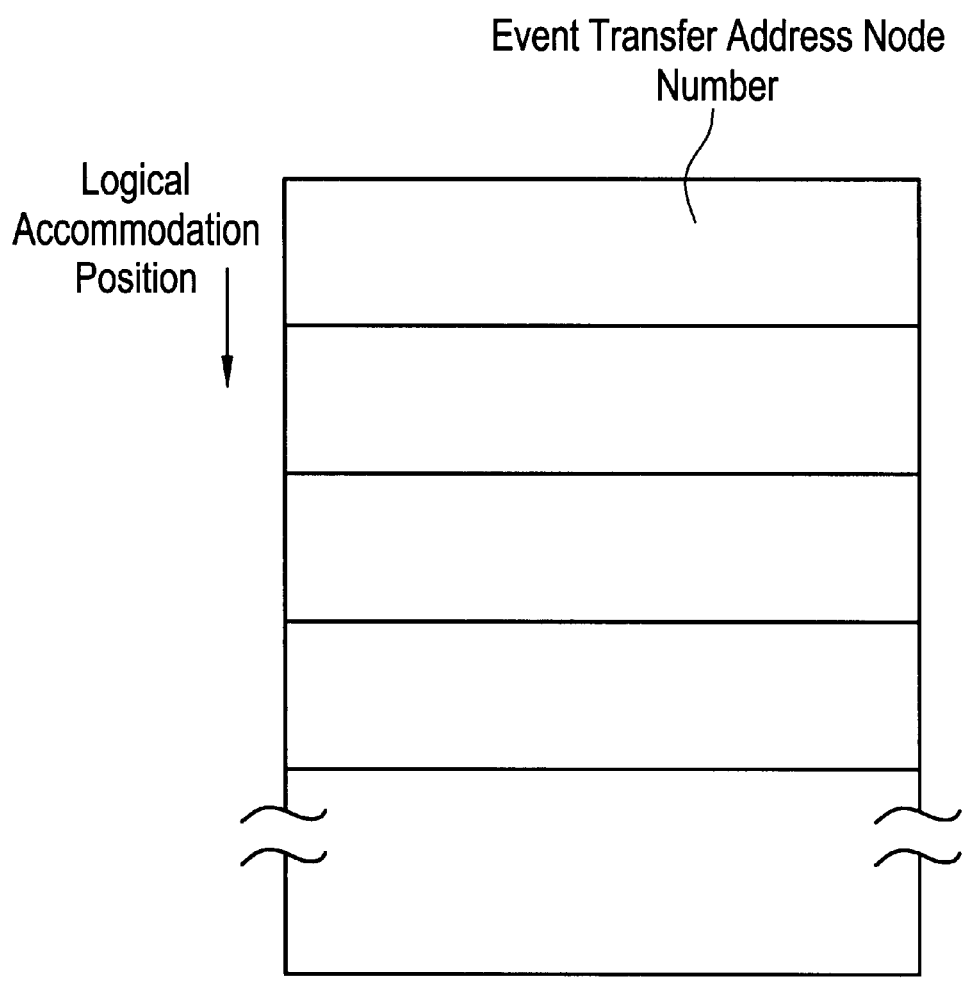
FIG. 10 is a view illustrative of an event transfer management memory managed by a connection control section in accordance with the service control in the preferred embodiment in accordance with the present invention.

The subscriber circuit and the trunk circuit are scanned by the PM scanning section to detect event informations such as calling control requests for each circuit. If the PM scanning section detects a calling process of a subscriber circuit 2 of the node "A", the physical accommodation position and the event information are inputted into the PM scanning section as illustrated in FIG. 5. The PM scanning section utilizes the conversion section 31 for converting the detected physical accommodation position into the logical. accommodation position in the step S51. An event transfer management memory as illustrated in FIG. 10 managed by a connection control section 8 in accordance with the service control and connection state is referred to determine where the event should be transferred in the step S52. An event transfer memory is a memory displaying processing node of this event. In the initial state, the transfer into the self node calling control section is shown. The setting of the connection control section changes where the event is transferred and then a designated processing node is shown. An event of extension call from an empty state is to be subjected to a self node transfer in the initial state, for which reason a logical accommodation position information of the calling extension line and a calling event information are informed to the calling control section 9 of the self node in the step S54. As illustrated in FIG. 6, the calling control section 9 analyzes the inputted information 57 and then executes various connection services in the step S61. Whereas for the various connection services, a plurality of service controls are present, in this embodiment the services in case of extension interconnection will be described. For processing of the calling control section 9, a resistor 40 is connected to a calling extension line so that a translator 41 in the calling control section 9 receives and then analyzes dial informations having been received by the resistor 41 whereby on the basis of the received called extension line numbers, a received logical accommodation position information 42 of the called extension in the network local data memory NDM11 and service informations 43 to be used for various connection services are obtained in the step S62. As a result, the calling control section 9 can avail logical accommodation position informations of two extension lines to be connected. The calling control section 9 executes a calling PM control in the step S63 to the subscriber circuit accommodating the calling extension line, a received PM control in the step S64 to the subscriber circuit accommodating the receiving extension line, a switching control in the step S65 for connecting channels of the calling and receiving extension lines, and a calling management memory control in the step S66 for management and control of the informations about accommodation positions to which the calling extension line is to be connected and a calling state. The call management memory is in the memory sections 24 and 25 of each node. As can be apparent here, since all of the processing of the call control section are executed at the inputted logical accommodation position, then the processings are possible regardless of which distributed nodes accommodate the subscriber.

Figure 7:
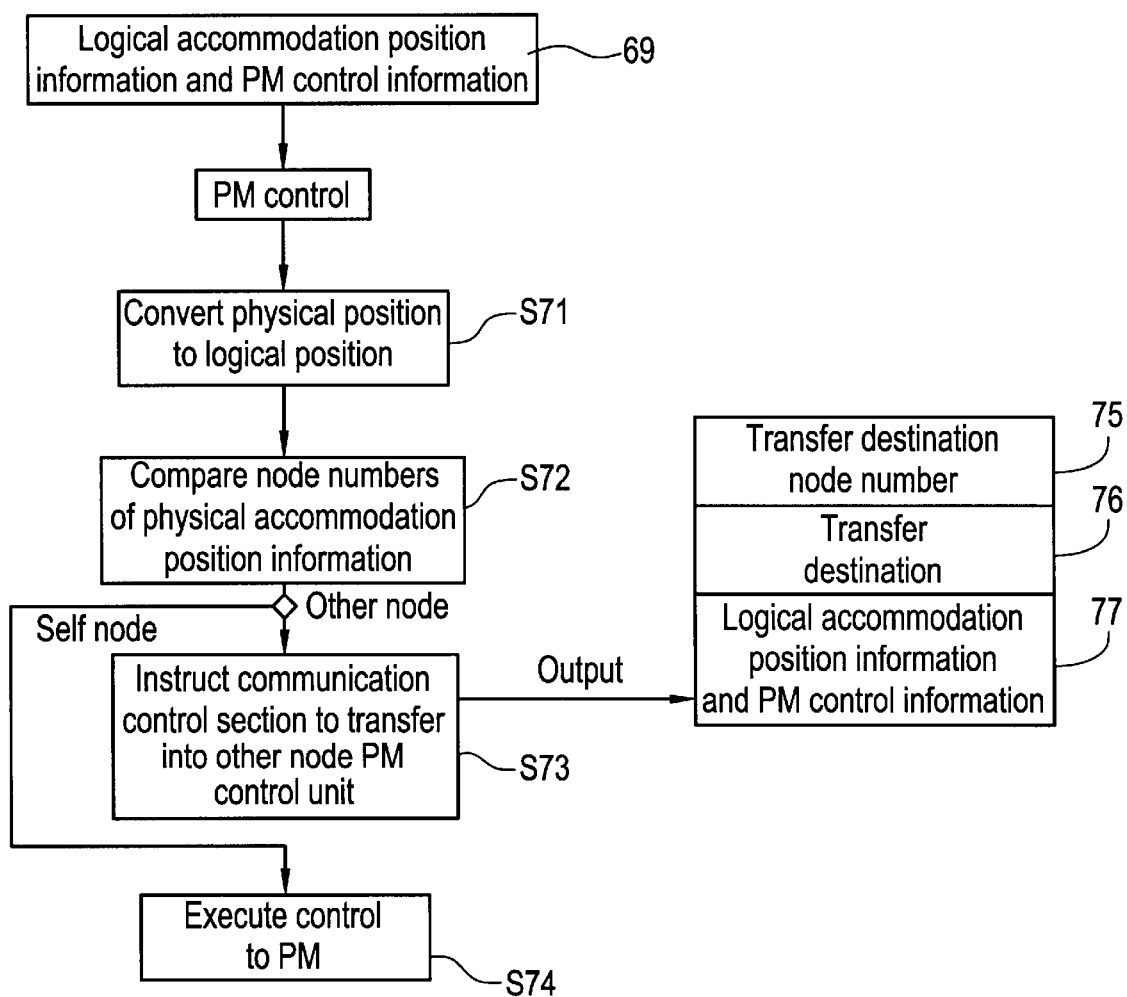

As illustrated in FIG. 7, the PM control instructed by the calling control section 9 are inputted with the logical accommodation position information and the PM control information 69. The PM control section 5 controls the converter section 31 to convert the logical accommodation position to the physical accommodation position in the step S71. The physical accommodation position information 32 includes a node number 33 to confirm whether or not the node number of the physical accommodation position is identical with the node number of the self node in the step S72.

The LDM of each node stores the node number of the self node. LDM-a stores the node number=A, whilst the node number of the self node. LDM-b stores the node number=B. In case of the PM control, the node number is identical with the self node number because of the subscriber circuit of the node "A". Thus, the PM control is made to the node circuit of the self node in the step S74. In case of the receiving PM control S64, the node number of the physical accommodation position is subjected to the comparison in the step S72. Since the receiving PM node number is node "B" and different from the self node, the PM control information is transferred to the communication control section 6 to transfer the PM control information to the node "B" in the step S73. The communication control section 6 transfers informations to the communication control section 16 of the node "B" on the basis o the outputted transfer node number 75.

The communication control section 16 recognizes the transfer address 76 and then transfers into file PM control section 17. The processing at the PM control section 17 of the node "B" are made in the same manners as in the PM control section in the node "A". Namely, the control is made to the subscriber circuit 15 as the called subscriber from the logical accommodation position and the PM control information.

Figure 8:
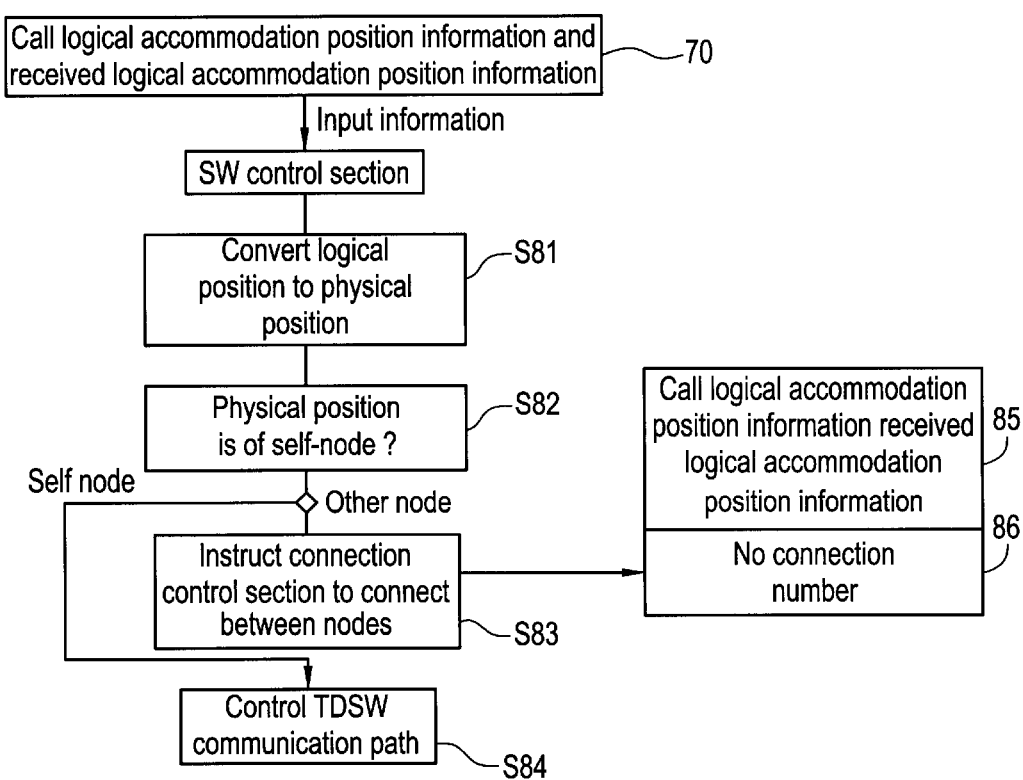

As illustrated in FIG. 8, the SW control S65 provides the SW control section 7 with the logical accommodation position information 70 of the two lines to be connected. Similarly to the PM control section, the converter section 31 the two logical accommodation positions into the physical accommodation positions in the step S81. The node number of the physical accommodation position obtained by the step 81 is compared to the node number of the self node in the step S82. If the caller and the called subscriber are both the self nodes, then the TDSW2 is controlled to connect the channels in the step S84. If any one of the caller and the called subscriber is not the self node, the connection control section 8 is instructed to connect the channel between the nodes in the step S83. At this time, the two logical accommodation position information 85 and the no connection number 86 are inputted into t connection control section.

Figure 9:
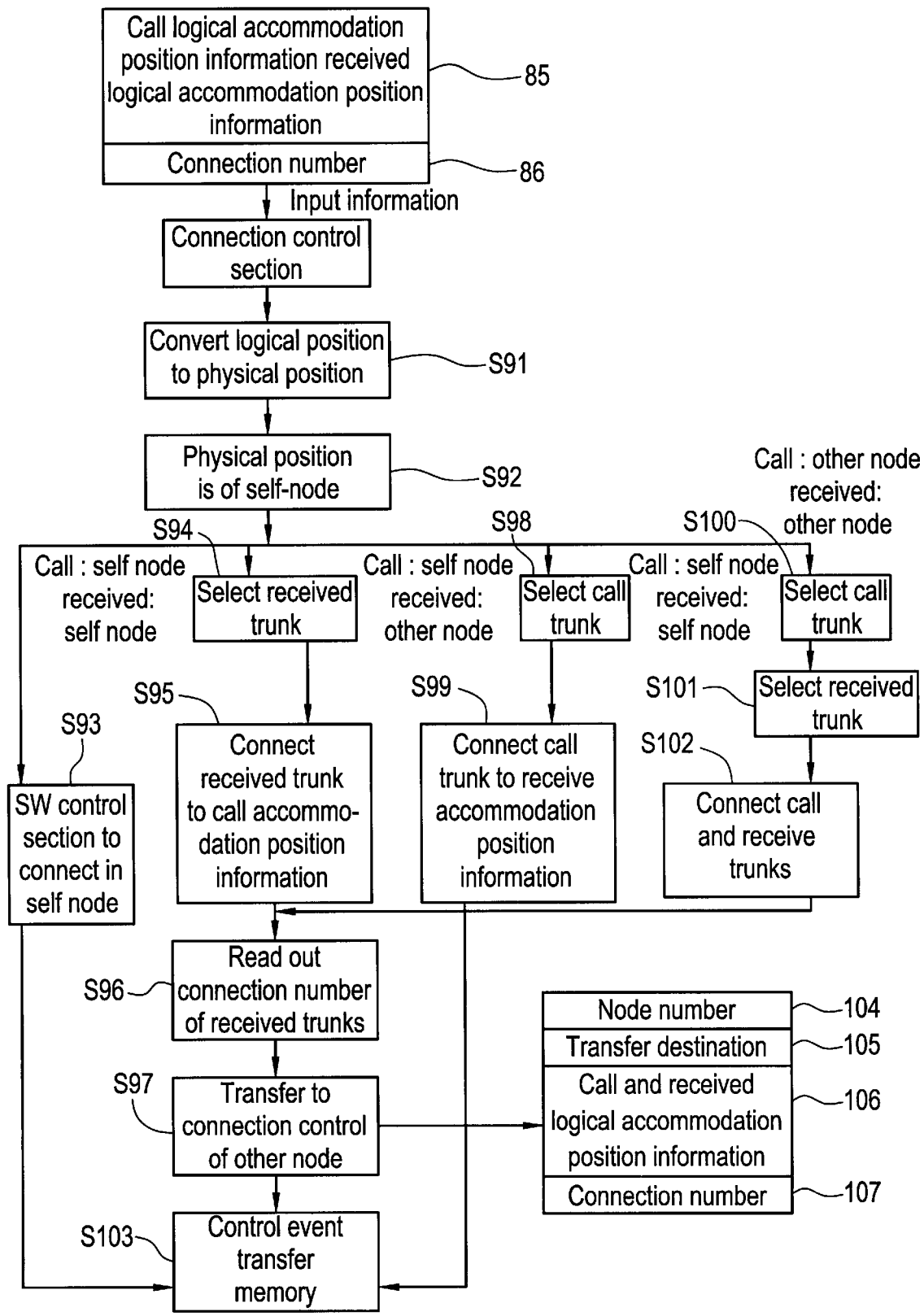

As illustrated in FIG. 9, the connection control section 8 controls the converter section 31 to convert the inputted calling and receiving logical accommodation positions 85 into the physical accommodation positions in the step S91. The obtained node number of the physical accommodation position is compared to the self node number to confirm that the caller is the self node and the called subscriber is other node in the step S92. The trunk circuit selected in correspondence to the node number of the other node has previously been set in the LDM-1 10. The connection control section 8 reads out the trunk circuit available for calling from the node number of the called subscriber to be connected from the LDM-1. The connection control section 8 executes a free talking management of the plural call trunks in the trunk circuit 3. A free circuit is selected from the trunk circuit available for the calling in the step S94. The selected trunk logical accommodation position information and calling extension line logical accommodation position information are informed to the SW control section 7 to connect the channel of the self node in the step S95. Thereafter, in order to notify the selected trunk circuit to the node "B", the connection numbers allocated to the trunk circuits 3 and 13 are read out from the LDM-a in the step S96, so that the connection control start of the communication control section 6 to the node "B" inclusive of the connection number 107 is carried out in the step S97. The communication control section 6 transfers the informations to the communication control section 16 of the node "B" on the basis of the notified transfer address node number 10. The communication control section 16 transfers input informations 106 and 107 to the connection control section 20 on the basis of the transfer address 105. The connection control 20 at the receiving side carries out comparison based upon the input information 85 (106) so hat the trunk circuit 13 is estimated on the basis of the received connection number 86 (107) with reference to the LDM-b 22 in the step S98. A connection between the trunk circuit 13 and the subscriber circuit 15 is made in the step S99.

The process 100 of the connection control section is a processing when the calling and receiving are the other nodes than the self nodes namely in the relay exchange and also is capable of processing the connections among not less than three nodes. Finally, a memory control of the event transfer management memory shown in FIG. 10 is executed in the step S103. The event transfer management memory is a memory showing which node calling control section is to process for every logical accommodation positions caused for every events. The event transfer management memory is in the memory sections 24 and 25 in each node and is managed by the connection control section 20. The event transfer management memory is used to prevent conflicting processings appearing in the exchange. If the call process of the subscriber circuit 1 is completed and the called subscriber is on the calling, there is a possibility of concurrent appearances of caller's abandon and a called subscriber's response thereto. In order to prevent that the response and abandon by the calling control section 9 in the node "A" and the calling control section 21 in the node "B" are concurrently processed, if the called subscriber is on the calling, the event transfer address of the subscriber circuit 1 of the node "A" is changed into the node "B" but the event transfer address of the subscriber circuit 15 of the node "B" remains unchanged in the node "B", so that the event transfer addresses of the nodes "A" and "B" are set and controlled to be the same. The different two events are always processes in the same calling control section by the event transfer management memory.

In response to the called extension line, as illustrated in FIG. 5, the PM scanning section 18 detects the response by the subscriber circuit 15. Similarly to the calling event detection, the PM scanning section 18 is inputted with the physical accommodation position of the subscriber circuit 15 and the event information. The inputted physical accommodation position is converted by the converter 31 into the logical accommodation position in the step S51. With reference to the event transfer management memory of FIG. 9, the event notification address is determined in the step S51. Since the event transfer management memory now on calling indicates the node "B" as described above, the transfer into the node "B" is carried out. A response event of the subscriber circuit 15 is processed by the call control section 21 to obtain the logical accommodation position of the caller from the call management memory for execution of the response as the called extension line response processing by indicating the PM control section and the switching control section in the step S61. The calling control section can process at the logical accommodating position similarly to the calling processing, if even the inter-node processings.

As described above, the calling control section realizable by the calling control or the calling process software is capable of instructing controls of the SW control section and the PM control section without discriminating the connection process in the self node or the connection extending the nodes and also capable of offering any other exchange services such as restoration processings and transfer processings.

It is possible that the plural distributed system node exchanges are configured for exchange processings in the automatic cooperation, wherein it is required that the transmission path is formed in the communication control section for transmission and receiving of the control signal and exchange processing information between the node calling processing control circuit or the processors.

Figure 11:
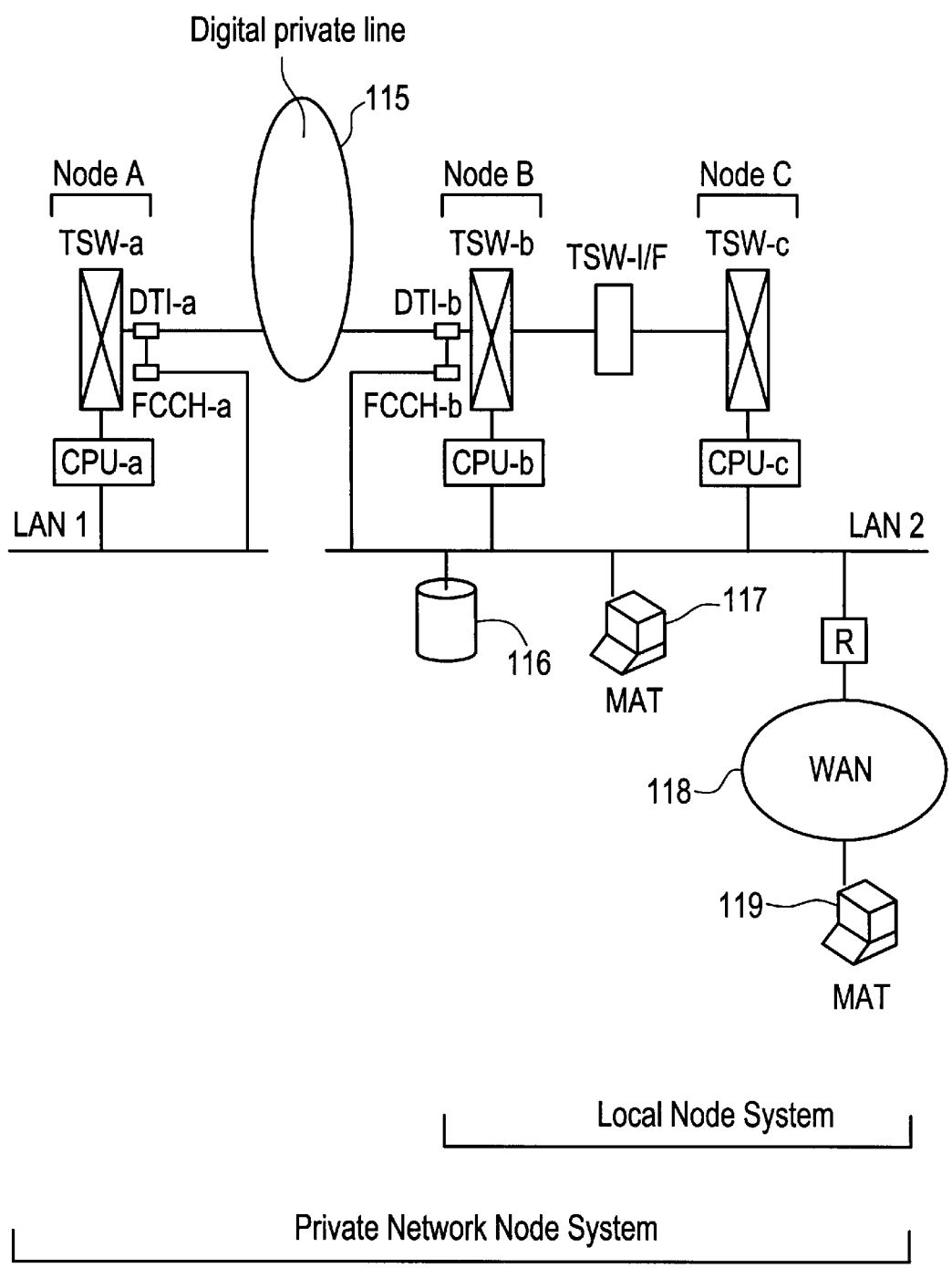
FIG. 11 is a view illustrative of a network configuration of the provided with a transmission path configuration in one embodiment of the present invention.

FIG. 11 is a view illustrative of a network configuration of the provided with a transmission path configuration in one embodiment in accordance with the present invention.

In this embodiment, a complex network system comprises a private network node system having distributed system nodes "A", "B" and "C" and a local node system having the distributed system nodes "B" and The node "A" has a channel switch TSW-a and a processor CPU-a. The node "A" has a channel switch TSW-b and a processor CPU-b. The node "C" has a channel switch TSW-c and a processor CPU-c. The individual channel switches of each of the nodes are connected private channel switch interface TSW-I/F in the local node system. The private node system and the local node system are connected by digital trunk interfaces DTI-a and DTI-b of the digital private line 115.

The transmission and receiving of the informations for each processor between the nodes are made by the processor bus of the local area network (LAN) The processor bus comprises two local area networks LAN1 and LAN2. Those connection to the processors are made by the standard LAN interface. The processors CPU-a, CPU-b and CPU-c are interfaced to the local area networks LAN-a, LAN-b and LAN-c respectively for transmission and receipt of the calling control information for inter-node communication and system control information and maintenance information.

More concretely, in the private network node system, the individual processors are interconnected to each other via the T1/E1 digital interfaces. Processors between the LAN1 and the LAN2 integrating the local and private node systems by are connected to the interfaces DTI-a and DTI-B of the nodes "A" and "B" connected to the digital private line 115 via the T1/E1 digital interfaces through the fusion call control handles FCCH-a and FCCH-b as the communication control section so that the transmission and receiving informations are multiplexed on multiplexed lines.

In this node exchange network system, the local area networks LAN1 and LAN2 are connected for transmission and receiving the calling control information for the inter-node communication, system control information and maintenance information whereby the calling control between the nodes is possible, for which reason the node exchanges in the network effectively connected and coupled to connect a server for uniform maintenance to the terminals. For example, the terminals MATs 117 and 119 for maintenance and monitoring are connected directly to the LAN2 in the local node system or indirectly connected thereto via the rooter R, the LAN, wide area network such as internetwork. Further, a data base/application server is connected to the LAN2 for calling control in cooperation with the processors CPU-a and CPU-b for offering various service functions. Control signals for the specific channels of the time division multiplication lines on the digital private lines are transmitted from the LAN1 and LAN2 to the FCCH-a and FCCH-b. The FCCHs have functions filtering only the control signals to the address nodes whereby only the filtered signals are transmitted in accordance with the 64 bps or the signal amount as a time division signal of higher speed via the interface DTI-a or DTI-b of the private circuit and also via the T1/E1 digital interface here the signals are multiplexed. At the receiving side, the multiplexed signals are demultiplexed by the interface DTI-a or DTI-b and the FCCH-b and FCC-a and transmitted to the LAN 2 or LAN1.

Signal transmission and control of the necessary data for the service functions in the network system of the node exchange are uniformly carried out by the data base application server 116 connected to the local area network LAN2. Call control and communications of the inter-node calling control information and system control information are maintained by the maintenance terminals MAT 117 and MAT119.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A method for controlling communications between multiple independent distributed nodes, wherein each other includes a switch, a subscriber circuit, a trunk circuit and a call processor, said method comprising:

creating a network of plural nodes, each of said nodes connected to a network for processing communications between said nodes;

storing, in each node, a specific data base of call processing information for a specific node in the network of nodes;

storing, in each of said nodes, a common data base of call processing information common to all nodes, for the network of nodes, such that each node in the network has call status data for all ether nodes in the network;

executing distributed call processing by a plurality of said nodes;

converting between physical positions indicating the physical accommodating position of the trunk circuit and subscriber circuit and logical positions independent from the physical positions to thereby control a call control section of the call processor with each node.

2. The method of claim 1 and further including:

assigning a unique node number for each of the nodes in the network, such that the physically accommodating positions represent the node numbers.

3. The method of claim 2 and further including:

determining at each node in the network, which node processor is to receive a call request on the network; and transferring the call request to a specific node to establish a call communications path between selected nodes.

4. The method of claim 3 and further including:

controlling by the call processor at one of the nodes, trunk circuits at other nodes in the network.

5. A method for controlling communications between multiple independent distributed nodes, wherein each other includes a switch, a subscriber circuit, a trunk circuit and a call processor, said method comprising:

creating a network of plural nodes, each of said nodes connected to a network for processing communications between said nodes;

storing, in each node, a specific data base of call processing information for a specific node in the network of nodes;

storing, in each of said nodes, a common data base of call processing information common to all nodes, for the network of nodes, such that each node in the network has call status data for all ether nodes in the network; and executing distributed call processing by a plurality of said nodes; and receiving and transmitting, at each node, call control information, system control information and maintenance information for creating a communication path between nodes and operating and maintaining all of said nodes from a single point.

6. The method of claim 5, further more including:

creating a communication path within said node by itself, where receipt and transmissions of all information between nodes are unavailable.

7. A communications network comprising:
a plurality of nodes, each of said nodes connected to a network for processing communications between said nodes;
each of said nodes further including:
   a switch;
   a subscriber circuit:
   a trunk circuit;
   a control processor, wherein said switches of said nodes are inter-connected to each other via digital via private communication links, and control processors are interconnected to each other via said trunk circuits,
   means for storing a specific data base of all processing information for a specific node in the network of nodes;
   means for storing a common data base of all processing information common to all nodes, for the network of nodes, such that each node in the network has call status data for all other nodes in the network;
   means for executing distributed call processing by a plurality of said node;
   a private local area network;
   a plurality of private nodes, each private node connected to said private local area network;
   a local area network;
   a plurality of local nodes, each local node connected to said local area network; and
   means for establishing a communication path between said private local area network and said local area network;
   a data base server connected to said local area network.

8. A communications network comprising:
a plurality of nodes, each of said nodes connected to a network for processing communications between said nodes;
each of said nodes further including:
   a switch;
   a subscriber circuit:
   a trunk circuit;
   a control processor, wherein said switches of said nodes are inter-connected to each other via digital via private communication links, and control processors are interconnected to each other via said trunk circuits,
   means for storing a specific data base of all processing information for a specific node in the network of nodes;
   means for storing a common data base of all processing information common to all nodes, for the network of nodes, such that each node in the network has call status data for all other nodes in the network;
   means for executing distributed call processing by a plurality of said node;
   a private local area network;
   a plurality of private nodes, each private node connected to said private local area network;
   a local area network;
   a plurality of local nodes, each local node connected to said local area network; and
   means for establishing a communication path between said private local area network and said local area network; and
   a maintenance terminal connected to said local area network.

* * * * *

UNITED STATES PATENT AND TRADEMARK OFFICE
CERTIFICATE OF CORRECTION

PATENT NO. : 6,507,580 B1 Page 1 of 1
DATED : January 14, 2003
INVENTOR(S) : Makoto Hokari and Isao Oishi It is certified that error appears in the above-identified patent and that said Letters Patent is hereby corrected as shown below:

Column 4,
Line 61, change "4" to -- 2.4 --.
Line 64, change "5" to -- 2.5 --.

Column 5,
Line 60, change "logical." to -- logical --.

Column 6,
Line 67, change "o" to -- of --.

Column 7,
Line 15, change "81" to -- S81 --.
Line 23, change "t" to -- the --.
Line 57, change "hat" to -- that --.

Column 8,
Line 67, after "and" insert -- "C". --.

Column 9,
Line 2, change " "A" " to -- "B" --.
Line 25, change "DTI-B" to -- DTI-b --.
Line 57, change "FCC-a" to -- FCCH-a --.

Column 10,
Lines 20 and 54, change "ether" to -- other --.

Signed and Sealed this

Twenty-second Day of July, 2003

JAMES E. ROGAN
*Director of the United States Patent and Trademark Office*